United States Patent [19]

Paban

[11] Patent Number: 4,470,504
[45] Date of Patent: Sep. 11, 1984

[54] CARTRIDGES FOR ANCHORAGE OF BOLIX IN MINE ROADWAYS AND SIMILAR OPENINGS, PROCESSES OF ANCHORAGE AND CORRESPONDING PROCESSES OF MANUFACTURE

[75] Inventor: Rolland Paban, Pontailler-sur-Saône, France

[73] Assignee: Societe Anonyme d'Explosifs et de Produits Chimiques, Paris, France

[21] Appl. No.: 268,362

[22] Filed: May 29, 1981

[30] Foreign Application Priority Data

May 30, 1980 [FR] France ............................... 80 12153

[51] Int. Cl.³ ..................... C21D 20/02; B65D 25/08
[52] U.S. Cl. ................................... 206/219; 405/261; 206/0.5; 206/524.7
[58] Field of Search ................. 206/216, 219, 0.5, 0.7, 206/524.7; 405/261; 428/36

[56] References Cited

U.S. PATENT DOCUMENTS 3,166,871 1/1965 Simison ................................ 206/216
4,000,996 1/1977 Jordan ................................. 206/219
4,341,301 7/1982 Meyer et al. ........................ 206/219
4,399,911 8/1983 Murphy et al. ..................... 206/219

Primary Examiner—William T. Dixson, Jr.
Assistant Examiner—Brenda J. Ehrhardt
Attorney, Agent, or Firm—Wood, Dalton, Phillips, Mason & Rowe

[57] ABSTRACT

The invention relates to cartridges containing a mortar composition capable of being hardened by reaction with an aqueous liquid such as water. The cartridge is initially sealed and is perforated along its longitudinal axis just before use, after which the mortar composition is caused to come into contact with an aqueous liquid to cause hardening thereof. According to one method of application, the cartridge is immersed in water which causes a wetting of the mortar composition centrifugally, i.e. from the axis towards the outside. The advantages of such a cartridge are that rigidity can be maintained during activation of the mortar with ease of use and, if required, visual evidence of complete wetting of the mortar.

9 Claims, 8 Drawing Figures

CARTRIDGES FOR ANCHORAGE OF BOLIX IN MINE ROADWAYS AND SIMILAR OPENINGS, PROCESSES OF ANCHORAGE AND CORRESPONDING PROCESSES OF MANUFACTURE

This invention relates to the technique of anchorage, notably in underground mine roadways, of bolts or rods which serve to reinforce or render stable a substrate in which they are anchored.

The most recent techniques make use of prefabricated cartridges which are introduced, in a sufficient number, into blind holes drilled in the substrate. These cartridges contain compositions of two principal types:
organic compositions, notably of the polyester resin type; and
inorganic compositions, notably based on cement (hydraulic binders).

In the first case, hardening of the resin around the bolt in the hole is initiated either by a thermal effect (preheated bolt or heat produced by very rapid rotation of bolt) making use of filler, accelerators, or hardeners as appropriate, or by making use of other suitable additives, simply by mixing the reactive components in situ, when the introduction of the bolt breaks the cartridge.

It is known above all that inorganic compositions have significant advantages over organic compositions, particularly in the confined space of a mine roadway, in particular:
absence of toxic vapours or unpleasant odours,
noninflammability,
lower price.

Inorganic compositions for anchorings are well known. As well as the in situ injection of cement which presents great practical difficulties, the following are known:

(1) the in situ injection of cement, but with the help, in order to reduce the difficulties, of a perforated rigid tube into the interior of which is then introduced the anchor bolt, the cement being thus pushed through the orifices in the tube (Flygare; French Pat. No. 1,085,192);

(2) the preparation of cartridges combining dry cement of which the casing is permeable to water: just before use, the cartridge is immersed in water, which penetrates the casing and wets the cement; the cartridge is then placed in the drilled hole and the bolt inserted; this technique has a number of inconveniences:

(a) the casing being necessarily permeable to water has very bad resistance to penetration by humid air: the shelf-life of the cartridge is thus very limited;

(b) the casing, generally of paper, loses practically all its mechanical properties when wetted: the casing tears, or at least becomes less rigid, having thus to some extent the same practical difficulties as in situ injection;

(c) the difficulty in controlling the degree of wetting; cartridges are thus often wetted too much or too little, giving thereby bad anchorage or problems in installation; to overcome certain of these difficulties, the use of a stiffener for a resin cartridge has been proposed in French Specification Nos. 2,034,130 and 2,030,706), taking the form of a mesh tube; however, a stiffener allows only to preserve the rigidity and does not overcome the other difficulties;

(3) the use of an exterior casing which is finely perforated; this casing is of course very vulnerable to humid conditions.

It should be noted that in general the technique of immersion of a cartridge, before use, in a liquid, has been known for many years; more recently the immersion of inorganic anchoring compositions in water has been disclosed in French Specification No. 2,202,548.

In all these cases, the mixing by the liquid is centripetal, that is to say the liquid, generally water, wets the cartridge or the composition which it contains, from the exterior towards the centre of the composition, with the difficulties which have been stated above and which are particularly of note and relevant in the field of anchoring cartridges.

The invention provides a solution in a particularly simple manner to all the problems relating to anchoring cartridges, in particular inorganic cartridges which require to be wetted before use.

According to the invention and contrary to the state of the art, a cartridge is used of which the casing is totally impermeable to water (and in consequence sealed against humidity). This casing contains the complete dry mortar composition with its additives. Preferably the form of the cartridge is an elongated cylinder corresponding to the dimensions of the bore hole into which it is to be placed. This characteristic according to which the exterior casing is water tight is combined, according to the invention, with other characteristics of the cartridge and/or the composition which it contains, such that the assembly of the cartridge and its composition is designed to receive a correct wetting of the composition before its use.

A principal characteristic of the cartridges is that they are adapted such that the wetting liquid penetrates one or both axial extremities of the cartridge.

According to one embodiment which is preferred because of its simplicity, the cartridge according to the invention consists essentially of:
an exterior casing totally watertight and impermeable to humidity preferably having a generally cylindrical form; and
an inorganic mortar composition displaying certain physical characteristics notably of density.

The process according to the invention by which this cartridge is used consists of the following steps:

(1) using this cartridge sealed against water;

(2) making, just at the moment of use, in the cartridge composition a central cavity along the longitudinal axis along the full length or effectively the full length of the cartridge, the cavity communicating with the exterior by at least one orifice made in one of the ends of the cartridge, (preferably both);

(3) introducing in the said cavity a quantity of water at least equal to the quantity necessary for adequate mixing (that is to say sufficient to provide good setting results of the mortar) of the composition;

(4) allowing the wetting of the composition to be accomplished;

(5) placing one or several cartridges of this type, treated identically as indicated in steps (2) to (4), in a bore hole drilled in a substrate such as underground rock strata;

(6) pentrating with a bolt in the hole the said cartridges which are thus destroyed and release the mortar composition in the course of setting, thus providing an anchorage for the bolt.

Varying methods may be used to make the longitudinal cavity in the cavity, two principal methods, which have given very good results, being as follows:

(a) perforation of the cartridge along its longitudinal axis and through one of its extremities (or both) by one (or two) longitudinally extending implements adapted to penetrate into the composition and to leave on withdrawal the desired cavity and one (or two) orifices for communication between the cavity and the exterior. The cartridge thus perforated is then immersed in water; the water does not penetrate through the casing because it is watertight but fills the cavity and thus there is a centrifugal wetting of the mortar composition, that is to say from the cavity towards the casing. If a transparent or translucent casing is chosen, a colour change indicates the moment when the water reaches the casing and when the moment of optimum mixing is achieved. This is impossible with the known types of cartridges and processes. Even if the casing is fragile, for example made of Kraft paper, it is only caused to be lightly wetted and retains a rigidity sufficiently for it to be introduced in the bore hole;

(b) preperforation of the cartridge at the time of manufacture along its longitudinal axis by a rod of suitable shape and size which is left in place in the cartridge and provides a waterproof joint at each of the two perforations of the casing made by the rod; at the time of use, the rod is totally withdrawn to leave the cavity and the orifice or orifices of communication between the said cavity and the exterior, and the composition can then be wetted and used as in (a) with the same advantages;

(c) use of the technique described in (a) with the following variation: A single longitudinally extending implement is used which perforates the cartridge through one of its extremities and which then after having passed through all the composition, perforates a water capsule placed at the opposite extremity at the time of fabrication of the cartridge; on removal of the implement the water (of which the quantity contained in the capsule is at least equal to the minimum quantity for wetting of the composition) floods the cavity; the capsule may easily be inclined to avoid loss of water through the perforation hole; the capsule may be formed by a pocket contained within the casing of the cartridge or by the casing itself, the extremity corresponding to the end of the cartridge and a perforatable barrier sealed equally to water and humidity separating the interior volume of the cartridge which contains the composition; the same advantages are obtained as previously and the method of use is identical. In order to prevent introduction of useless fragments of casing and/or of the water capsule into the bore hole, a detaching device such as a tag or perforation may be used which allows, without loss of water tightness during storage, to easily detach the part of the cartridge containing the mixed composition from the part of the casing and/or capsule originally containing the water;

(d) the variant described in (c) may be used with two longitudinally extending implements and consequently placing the capsule of water in a central position within the cartridge. Thus it is possible to combine two different mortar compositions in the same cartridge, for example of different reactivity to obtain special hardening effects which the bore hole.

Preferred embodiments of the invention will be better understood from the following description which refers to the accompanying drawings in which:

FIG. 1, which includes FIGS. 1a, 1b, 1c and 1d represents the method of using the cartridge of the invention, the cartridges being represented in longitudinal section (FIGS. 1a, 1b and 1c) or transverse section (FIG. 1d) which is a cross-section along the line AA of FIG. 1c;

Figure 1A:
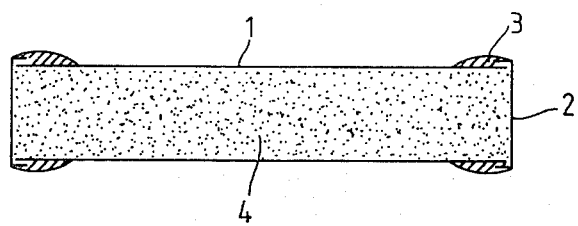
Figure 1B:
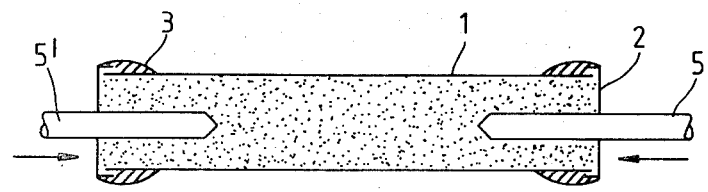
Figure 1C:
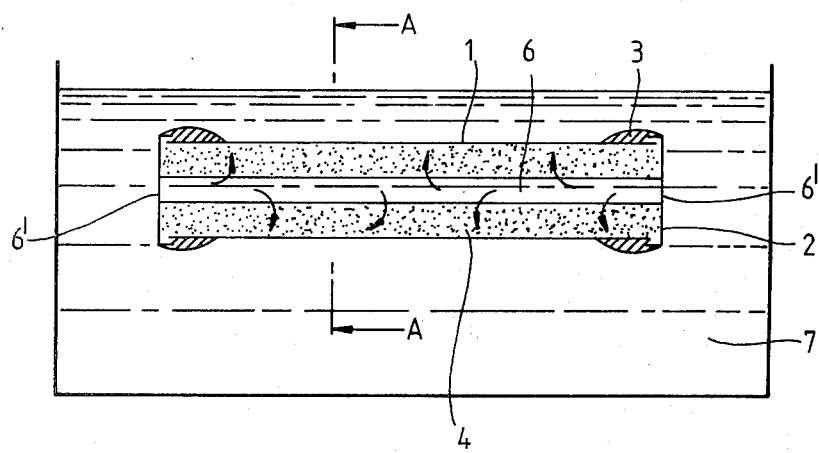
Figure 1D:
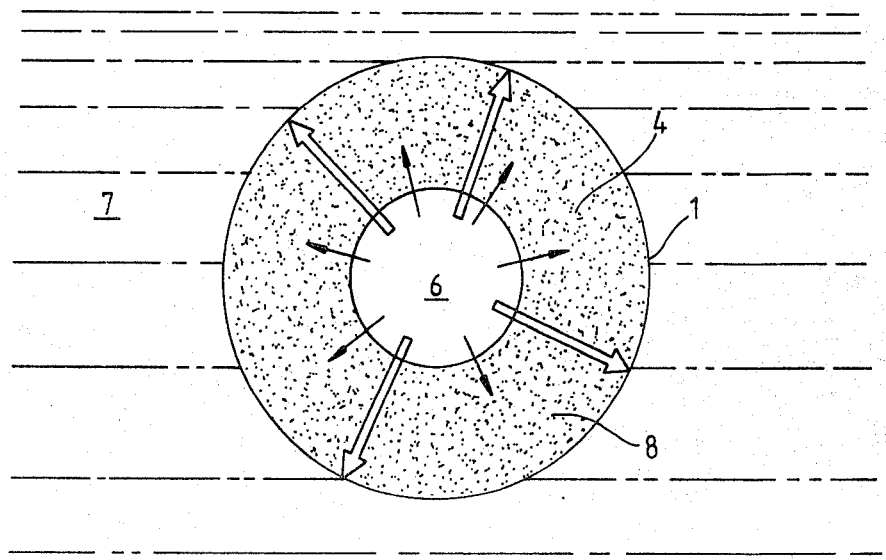
Figure 2:
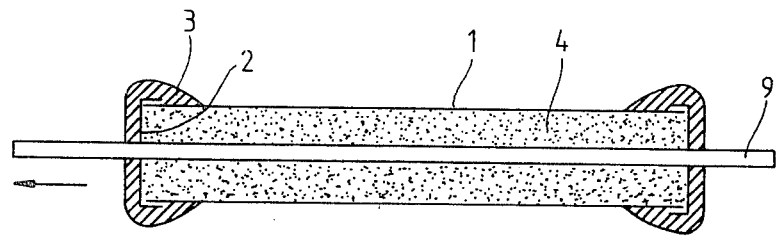
FIG. 2 represents a longitudinal section of another cartridge according to the invention; the cartridge comprises a rod which is removed before use.
Figure 3:
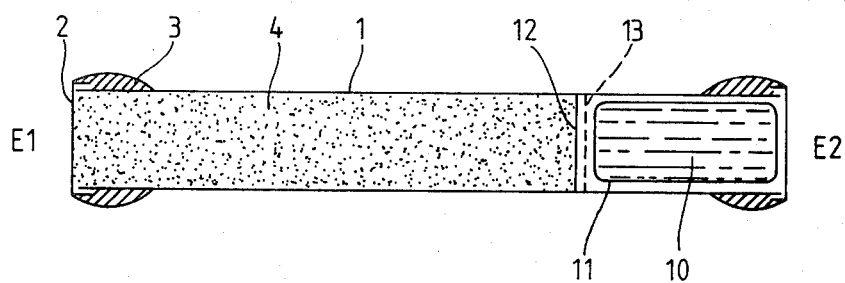
FIG. 3 represents another type of cartridge in longitudinal section adapted to be used by the process according to the invention, the cartridge containing a water capsule.
Figure 4:
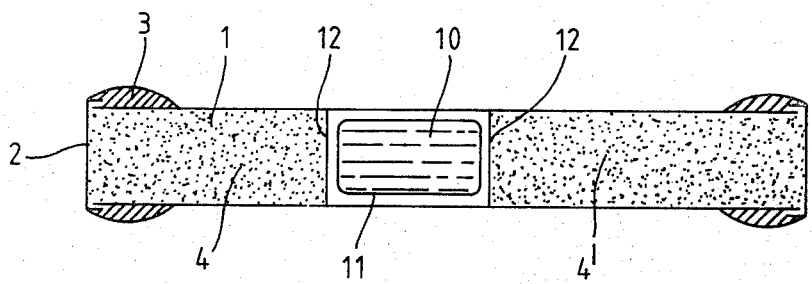
FIG. 4 represents a longitudinal section of another cartridge similar to that represented in FIG. 3, but having the capsule in a central position.

In FIGS. 1 to 4, the same references have the same meanings which are as follows:

1—casing or lateral wall of the cartridge, waterproof and impermeable to humidity and rigid;

2—end wall of the cartridge, waterproof and impermeable to humidity; (elements 1 and 2 may also be constructed integrally in a single piece);

3—waterproof joints in the case where the elements 1 and 2 are separate;

4—dry mortar composition hardenable by water;

5, 5'—longitudinal implements for making the cavity;

6—cavity;

6'—communication orifice between the cavity and the exterior;

7, 10—water or aqueous solution for wetting the dry mortar;

8—peripheral zone of the composition: if the wall 1 is transparent or translucent it is possible to identify the completion of wetting because the water reaching the peripheral zone

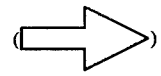

alters the colour:

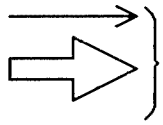

representation of centrifugal wetting according to the invention;

9—withdrawable rod (variant b);

11—capsule (variant c) watertight and impermeable to humidity;

12—separate wall between composition and the capsule (the capsule 11 need not exist if the wall 12 is watertight and impermeable to humidity).

13—device to allow detachment of the zone having contained the water after the wetting;

E1—in the variant (c) is the extremity through which the implement perforates the cartridge;

E2—is the extremity opposite to E1;

4'—(variant d) mortar composition which may be different from the composition 4.

The mortar compositions which may be used according to the process of the invention may comprise, for example:

hydraulic binders such as Portland cement, quick setting cement, obtained by heating natural clay, high alumina cement, plaster, soluble anhydrite, chalk, and other known binders, alone or in admixture, flyash, etc.;

dry silica sand which may be replaced completely or in part by dolomite, calcite, lime stone, graphite etc., and/or fibrous fillers such as chrysolite, asbestos, glass fibres, metallic powders, cellulosic or synthetic fibres, polyamides, polyolefines, polyesters, etc. (the fibres improve pentration of water at a level of several percent by weight as well as the resilience of the anchorage);

additives which preferably will be able to be incorporated in the dry mortar but equally well could be incorporated in the mixing mortar;

plasticisers, for example Bentonite, lime, Kieselguhr etc.;

fluidifiers, for example, sodium lignosulphate;

set accelerators and/or hardness accelerators for cement;

set retarders or additives, in general fine metallic powders (iron, aluminium, zinc) which reduce shrinkage and cause a small expansion.

Inorganic mortar compositions containing a hydraulic binder, such as those described above may be modified by incorporating therein an organic polymer chosen from among:

water soluble resins (preferably in powder form) such as urea-formaldehyde or melamine-formaldehyde resins, polyacryllic acids, acrylic esters etc., emulsions or suspensions of thermoplastic polymers (for example styrene, acrylic monomer, polyvinyl acetate etc.) which may be contained in the mixing water in a manner well known to the skilled worker.

Other hardenable inorganic systems may be used, the system comprising:

(a) at least one oxyphosphoric acid component chosen from phosphoric acids, e.g. $H_3PO_4$, phosphoric acid anhydrides, e.g. $P_2O_5$, and the salts of phosphoric acid, e.g. $Al(H_2PO_4)_3$; and (b) a particulate basic component comprising at least one particulate basic component of a Group II or Group III metal capable of reacting with the component (a) in the presence of water (activation liquid) to form a monolithic solid, for example magnesium oxide or hydroxide, magnesium silicate, magnesium aluminate or calcium aluminate.

According to one variant the powder composition consists solely of the basic component (b) and the wetting liquid consists of an aqueous solution of component (a).

One is able to use calcined magnesite as a solid component and an aqueous solution of magnesium chloride or sulphate as the activation liquid (or by variation a powder of calcined magnesite and magnesium chloride or sulphate and water for the moving).

As the casing which has to be watertight (and impermeable to humidity) and rigid or relatively rigid (although it is possible also to use as casing a flexible waterproof casing made rigid by a stiffening element inside or outside as for example the mesh tube previously described) the following may be used:

gummed Kraft paper (60 gr/$M^2$) wrapped in a manner to meet the following two criteria;

correct rigidity of the cylinder obtained after wetting, and ease of shredding.

The skilled worker will be able to select a suitable material taking account of the above.

A transparent or translucent skin or tube such as crystal polystyrene glass etc., laminates of cellulose with thermoplastic, laminates of paper with aluminium foil, laminates of various thermoplastics, etc., thermoplastic skins which may be used include polyester, polyvinyl chloride (PVC, polyethylene etc.

The two ends of this cylinder may be closed after filling either by two caps which in the case of variant (b) have to be centrally perforated to allow passage of the rod through the extremities, or by welding. Paraffin wax, hot melt adhesives etc., may be chosen for the watertight joints.

As the rod described in variant (b) it is possible to use a reinforced plastic, metal etc.

It is surprising to find that when the implement which is used to form the central longitudinal cavity is withdrawn, the cavity does not collapse. That is to say it does not crumble thanks to the powdered nature of the composition and above all when the water penetrates the cavity and commences to wet the sides of the cartridge. On the contrary, the cavity retains its correct form.

It is also surprising to find that even though the initial contact surface between water and the mortar composition is much less than in the previously known cartridges (in which the water penetrates through all the exterior lateral surface in a centripetal fashion) a mixture is obtained which is correct (and not nonhomogenous as one might fear) and also in a sufficiently rapid fashion (about 1–3 minutes).

Below are given the significant criteria and the results produced.

DENSITY OF THE MORTAR COMPOSITION

The density has to be sufficient to ensure a good stability of the cartridge during its transport before being used. On the other hand it has to be not too high with respect to the mode of use. Above all the density has to allow the formation and retention of the cavity according to the invention and in combination with the diameter of the cavity an optimal wetting of the composition, equally relatively to the diameter of the cartridge.

The satisfactory range of density is generally about 1.6 to 2.1 g/cc, preferably from 1.8 to 2.0 g/cc.

DIAMETER OF THE CAVITY

In accordance with the teaching above the density will be fixed here at about 1.9 g/cc for convenience but without limitation.

Tests have been made with a cartridge 165 mm long×25 mm diameter; the dry mortar composition has a formula as follows in percentage by weight:

Ciment Fondu (high alumina cement)—50%
Quartz sand (NE 34 Sifraco) 0.075–4 mm—18.75%
Quartz sand (16-14-2 Sika) 0.42–2.0 mm—31.25%
Accelerator: lithium carbonate—0.05% (of cement)
(water/cement ratio 0.35 by weight)

Three implements of different diameters have been tested:
2, 5 and 8 mm diameters.

Figure 5:
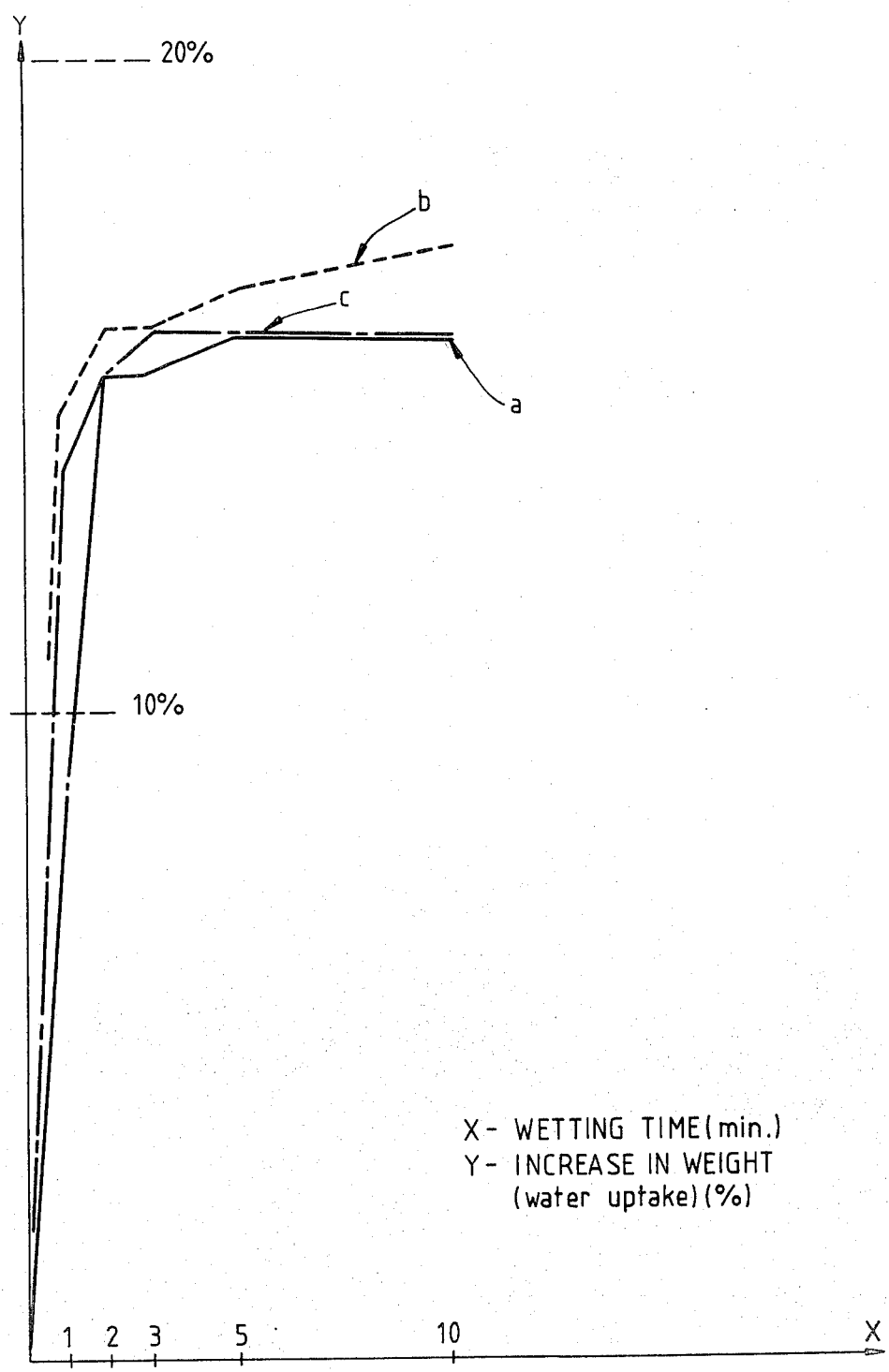
FIG. 5 is a graph containing hydration curves as a function of time relative to the diameter of the cavity within the cartridge.

FIG. 5 illustrates the rate of water uptake by the dry composition. In the case of the 8 mm rod the water/cement ratio of 0.32 was obtained, whereas with the 5 mm rod a ratio of 0.34 and with the 2 mm rod a ratio of 0.32 were obtained. It appears that with the 8 mm diameter rod, the composition is more compressed than with the 5 mm diameter rod and that with the 2 mm diameter rod collapse of the cavity is produced.

Rods having a diameter of between 4 to 6 mm will therefore be chosen for this density and for this diameter of cartridge.

Of course the skilled worker will know how to choose an appropriate diameter value for corresponding density and diameter of cartridge, and will know how to optimise the diameter of the implement merely by carrying out several simple tests and comparing the results with the teaching of FIG. 5.

It should be noted that with the values in the chosen example, namely density 1.9, cartridge diameter 25 mm, implement diameter 5 mm, the ratio between the cross-section of the implmenet and cross-section of the composition is about 4%. The preceding data shows that it is possible to work effectively with values of these ratios between out 0.6 and 10%. In FIG. 5 the curves A, B and C correspond respectively to an implement of 2 mm, 5 mm and 8 mm diameter (density 1.9 g/cc; cartridge diameter 25 mm).

The following Examples illustrate the invention without in any way limiting its scope. Two types of tests have been carried out; tests with cement cartridges only and tests with a mixture of cement and polyester cartridges.

EXAMPLE 1

A 30 mm diameter×250 mm long cartridge consisted of a 60 g/m² gummed Kraft paper casing which contained 323 g of a dry mortar consisting of 50 weight% Ciment Fondu (high alumina cement), 18.75 weight% quartz sand (0.075-4 mm), 31.25% weight% quartz sand (0.042-2 mm), and 0.05 weight % (based on the cement) lithium carbonate accelerator, this mortar requiring a water/cement ratio of 0.35 by weight. The mortar has a density of 1.9 g/cc.

An axial cavity was formed in the cartridge by inserting from one end thereof a pointed rod having a diameter of 6 mm and then withdrawing the rod. The cavity extended over the whole length of the cartridge and had openings at both ends. The cartridge was then immersed in water for 3 minutes.

Six such cartridges were placed in a 32 mm diameter×2000 mm deep borehole and a 20 mm diameter bolt was then spun into the borehole while rotating at about 1000 r.p.m. for about 15 seconds thereby bursting the cartridges and mixing the contents thereof to form therefrom a grouting composition which filled the annulus between the bolt and the borehole.

After 3 hours the bolt was able to sustain a tensile load of 7-8 tonnes which after 24 hours was increased to about 21 tons.

EXAMPLE 2

Into a 28 mm diameter bore hole was placed an unsaturated polyester cartridge of a known type having a volume of 225 cc., followed by four cementitious cartridges similar to that described in Example 1 but having a diameter of 23 mm and length of 225 mm and having a mortar filling of density 1.8 g/cc. After the formation of the cavity in each cementitious cartridge, immersion in water took place for 2 minutes prior to insertion in the bore hole.

A bolt was rotated in the bore hole in the manner described in Example 1 for 35 seconds.

After 1 hour, the bolt was able to withstand a tensile load of about 21 tons.

What I claim is:

1. An anchoring cartridge for use in anchoring a bolt or rod in a bore hole in an underground substrate, said cartridge comprising a generally cylindrical frangible liquid-impermeable casing containing a particulate liquid-settable solid mortar composition, said casing being provided at the time of delivery of setting liquid to said composition with a longitudinally extending, liquid flow conductive cavity having at least one end thereof opening through at least one end of the cartridge so as to be in communication with the exterior, whereby when at least said one end of the cartridge is immersed in a liquid capable of reacting with the solid mortar composition so as to cause it to set, the liquid is caused to flow through said end of the cartridge into said cavity within the cartridge and thereby wet said solid mortar composition over substantially its whole length within the casing.

2. A cartridge as claimed in claim 1, wherein the cavity extends over the whole length of the cartridge so as to have both ends thereof located respectively at the ends of the cartridge and in communication with the exterior.

3. A cartridge as claimed in claim 1 or 2, wherein the cavity is axially disposed within the cartridge.

4. A cartridge as claimed in claim 3, wherein the cavity is filled with a longitudinally extending withdrawable rod which is adapted to be withdrawn from the cartridge when required for use so as to leave the cavity within the cartridge.

5. An anchoring cartridge comprising:
   a hollow casing formed of a material having low wet strength and substantial dry strength;
   a body of dry cementitious, water-settable material in said casing, said material being maintained in the dry state by said casing prior to use;
   means defining a transfer passage having a preselected configuration for conducting water therethrough for effecting distribution of water outwardly from said transfer passage through said body of material toward said casing for substantially uniformly wetting said material to effect uniform setting thereof; and
   means defining an opening through said casing in communication with said passage for passing water into said transfer passage from exteriorly of said casing when desired.

6. The anchoring cartridge of claim 5 wherein said passage extends substantially fully through said material.

7. The anchoring cartridge of claim 5 wherein said passage extends substantially axially through said material.

8. The anchoring cartridge of claim 5 wherein said casing is formed of paper.

9. The anchoring cartridge of claim 5 wherein a second such opening is provided through said casing spaced from said first named opening.

* * * * *

UNITED STATES PATENT AND TRADEMARK OFFICE
CERTIFICATE OF CORRECTION

PATENT NO. : 4,470,504
DATED : September 11, 1984
INVENTOR(S) : Rolland Paban

It is certified that error appears in the above-identified patent and that said Letters Patent is hereby corrected as shown below:

On the title page;

Correct the word "Bolix" in the title to --Bolts--.

Signed and Sealed this

Thirtieth Day of July 1985

[SEAL]

Attest:

DONALD J. QUIGG

Attesting Officer     Acting Commissioner of Patents and Trademarks